United States Patent
Wu et al.

(10) Patent No.: US 10,049,580 B1
(45) Date of Patent: Aug. 14, 2018

(54) AUTOMOTIVE VEHICLE WITH AN ANTI-CRASH APPARATUS

(71) Applicants: Ming-Zong Wu, Taichung (TW); Sen-Tien Wu, Taichung (TW)

(72) Inventors: Ming-Zong Wu, Taichung (TW); Sen-Tien Wu, Taichung (TW)

( * ) Notice: Subject to any disclaimer, the term of this patent is extended or adjusted under 35 U.S.C. 154(b) by 0 days.

(21) Appl. No.: 15/801,616

(22) Filed: Nov. 2, 2017

(51) Int. Cl.
| | |
|---|---|
| *B60Q 1/00* | (2006.01) |
| *G08G 1/16* | (2006.01) |
| *B60Q 1/26* | (2006.01) |
| *B60Q 1/52* | (2006.01) |
| *B60R 1/00* | (2006.01) |
| *B60J 5/04* | (2006.01) |
| *E05B 85/12* | (2014.01) |
| *E05B 85/16* | (2014.01) |
| *E05B 77/24* | (2014.01) |
| *E05B 81/58* | (2014.01) |
| *E05B 77/54* | (2014.01) |
| *E05B 81/90* | (2014.01) |
| *B60Q 9/00* | (2006.01) |
| *E05B 77/26* | (2014.01) |

(52) U.S. Cl.
CPC ............ *G08G 1/166* (2013.01); *B60J 5/0413* (2013.01); *B60Q 1/268* (2013.01); *B60Q 1/2665* (2013.01); *B60Q 1/2669* (2013.01); *B60Q 1/525* (2013.01); *B60Q 9/008* (2013.01); *B60R 1/00* (2013.01); *E05B 77/245* (2013.01); *E05B 77/54* (2013.01); *E05B 81/58* (2013.01); *E05B 81/77* (2013.01); *E05B 81/90* (2013.01); *E05B 85/12* (2013.01); *E05B 85/16* (2013.01); *B60R 2300/20* (2013.01); *B60R 2300/8066* (2013.01); *E05B 77/26* (2013.01)

(58) Field of Classification Search
None
See application file for complete search history.

(56) References Cited

U.S. PATENT DOCUMENTS

| | | | |
|---|---|---|---|
| 2005/0280518 A1* | 12/2005 | Bartels ................. | B60Q 1/2665 340/435 |
| 2014/0098230 A1* | 4/2014 | Baur .................... | B60R 16/0232 348/148 |
| 2015/0330111 A1* | 11/2015 | Dente ..................... | E05B 81/86 701/49 |
| 2017/0096843 A1* | 4/2017 | Seo ......................... | B60J 5/0493 |

* cited by examiner

*Primary Examiner* — Brent Swarthout
(74) *Attorney, Agent, or Firm* — Alan D. Kamrath; Kamrath IP Lawfirm, P.A.

(57) ABSTRACT

An automotive vehicle has multiple doors and an anti-crash apparatus having a handle unit, a sensing unit, an engaging unit, and a control unit. The handle unit has handles mounted on the doors. The sensing unit has sensing elements respectively mounted on doors and being adjacent to the handles. The engaging unit has multiple engaging elements respectively disposed on the doors and opposite to the handle, and each one of the engaging elements is capable of engaging the handle. The control unit has a timer and an operator connected to the timer, the sensing unit, and the engaging unit. Therefore, before users open the doors, the anti-crash apparatus enforces the users to check the approaching vehicles by delaying the opening time of the doors and improve the safety.

16 Claims, 16 Drawing Sheets

AUTOMOTIVE VEHICLE WITH AN ANTI-CRASH APPARATUS

BACKGROUND OF THE INVENTION

1. Field of the Invention

The present invention relates to an anti-crash apparatus, and more particularly to an automotive vehicle with an anti-crash apparatus to improve the safety.

2. Description of Related Art

About 30,000 motor drivers dead in automotive vehicle accidents related to improper opening of doors around the world in one year. To reduce the accidents, the present invention provides an anti-crash apparatus to prevent these accidents from happening.

In addition, a conventional detecting unit has been disclosed. When the conventional detecting unit detects the approaching vehicles, a fastening processing unit controls the door to close. However, if there are continually approaching vehicles behind, or other objects continually approaching, the door would not always locked and cannot be opened.

In addition, an automatically opening device is usually mounted in a taxi in Japan. However, when a passenger wants to open the door manually, the door is easily locked and cannot be opened.

SUMMARY OF THE INVENTION

The main objective of the present invention is to provide an automotive vehicle with an anti-crash apparatus which may improve the safety and has a children protecting effect.

An automotive vehicle has multiple doors and an anti-crash apparatus having a handle unit, a sensing unit, an engaging unit, and a control unit. The handle unit has handles mounted on the doors. The sensing unit has sensing elements respectively mounted on the doors and being adjacent to the handles. The engaging unit has multiple engaging elements respectively disposed on the doors and opposite to the handles, and each one of the engaging elements is capable of engaging the respective handle. The control unit has a timer and an operator connected to the timer, the sensing unit, and the engaging unit.

Therefore, before users open the doors, the anti-crash apparatus enforces the users to check the approaching vehicles by delaying the opening time of the doors and hence improves the safety.

Other objects, advantages, and novel features of the invention will become more apparent from the following detailed description when taken in conjunction with the accompanying drawings.

BRIEF DESCRIPTION OF THE DRAWINGS

FIG. 4b is an enlarged rear side view of the automotive vehicle with an anti-crash apparatus in FIG. 4a;

FIG. 9b is an enlarged rear side view of the automotive vehicle with an anti-crash apparatus in FIG. 7a;

DETAILED DESCRIPTION OF PREFERRED EMBODIMENT

Figure 1:
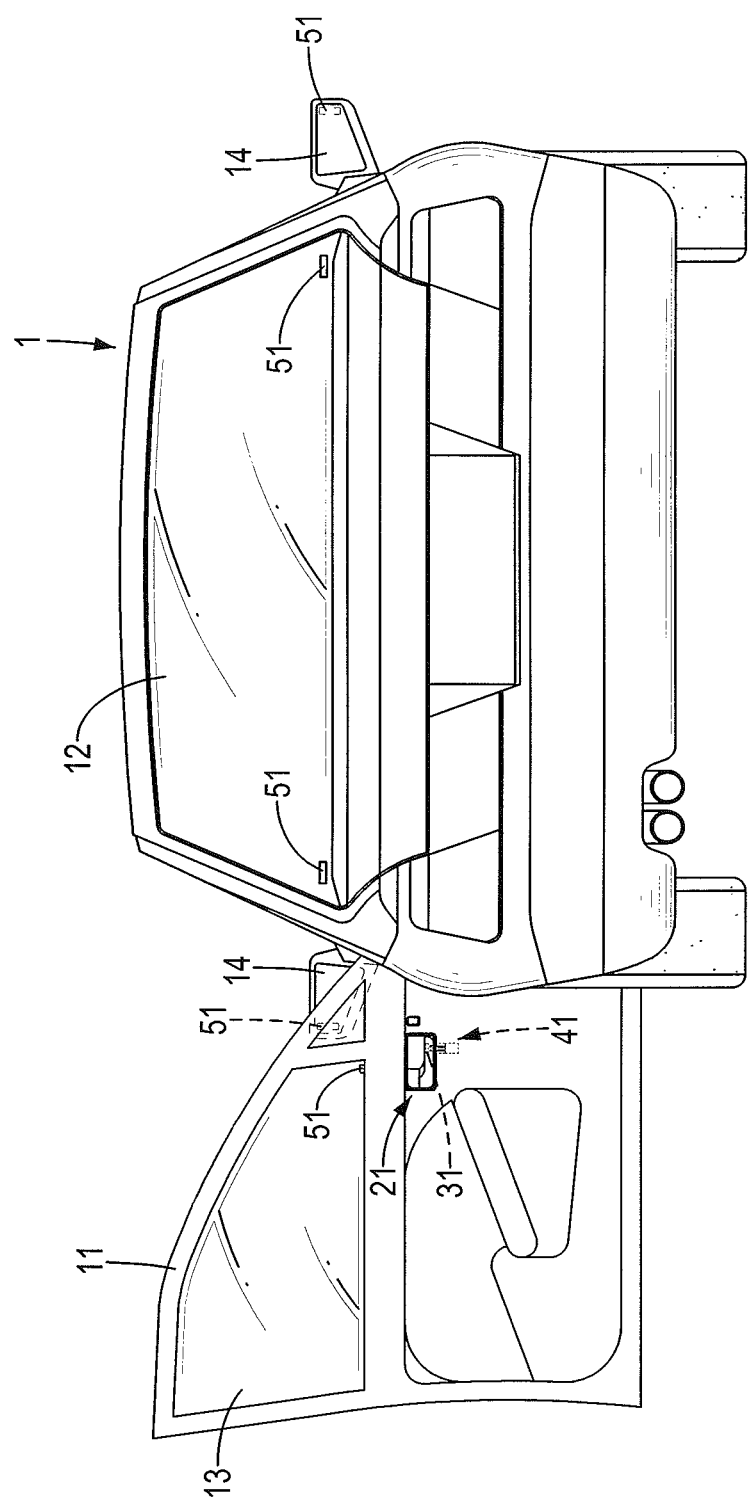
FIG. 1 is a rear side view of a first embodiment of an automotive vehicle with an anti-crash apparatus in accordance with the present invention.
Figure 2:
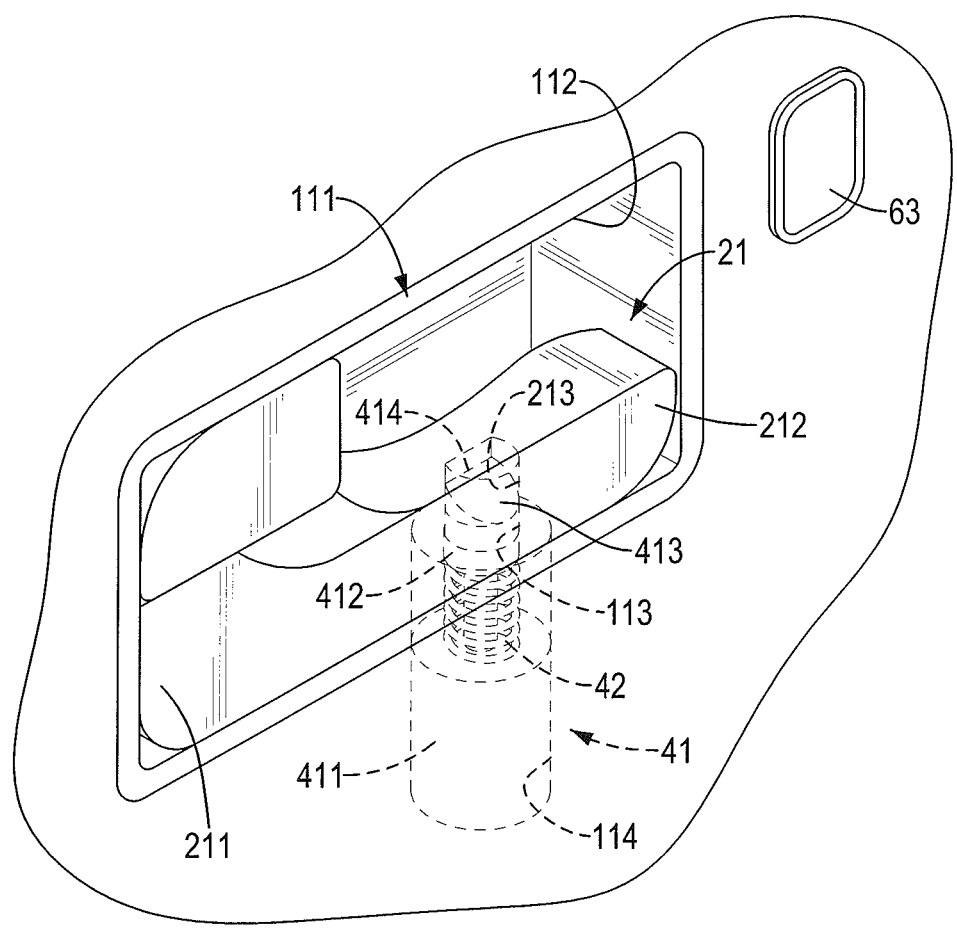
FIG. 2 is an enlarged perspective view of a handle unit and an engaging unit of the automotive vehicle with an anti-crash apparatus in FIG. 1.

With reference to FIGS. 1a, 1b, and 2 to 4, a first embodiment of an automotive vehicle with an anti-crash apparatus in accordance with the present invention is mounted on an automotive vehicle 1 and has a handle unit 2, a sensing unit 3, an engaging unit 4, an alerting unit 5, a control unit 6, a display unit 7, a main switch 8, and an emergency switch 9.

The automotive vehicle 1 has two sides, a front end, a rear end, multiple doors 11, a rear windshield 12, multiple windows 13, and two side mirrors 14. The doors 11 may comprise four doors, and two of the doors 11 are disposed on one of the two sides of the automotive vehicle 1, and the other two doors 11 are disposed on the other side of the automotive vehicle 1. The rear windshield 12 is disposed on the rear end of the automotive vehicle 1. The rear windshield 12 has multiple corners disposed around the rear windshield 12. The windows 13 are respectively disposed on the doors 11. The two side mirrors 14 are disposed on the two sides of the automotive vehicle 1 and are adjacent to the front end of the automotive vehicle 1.

Figure 3:
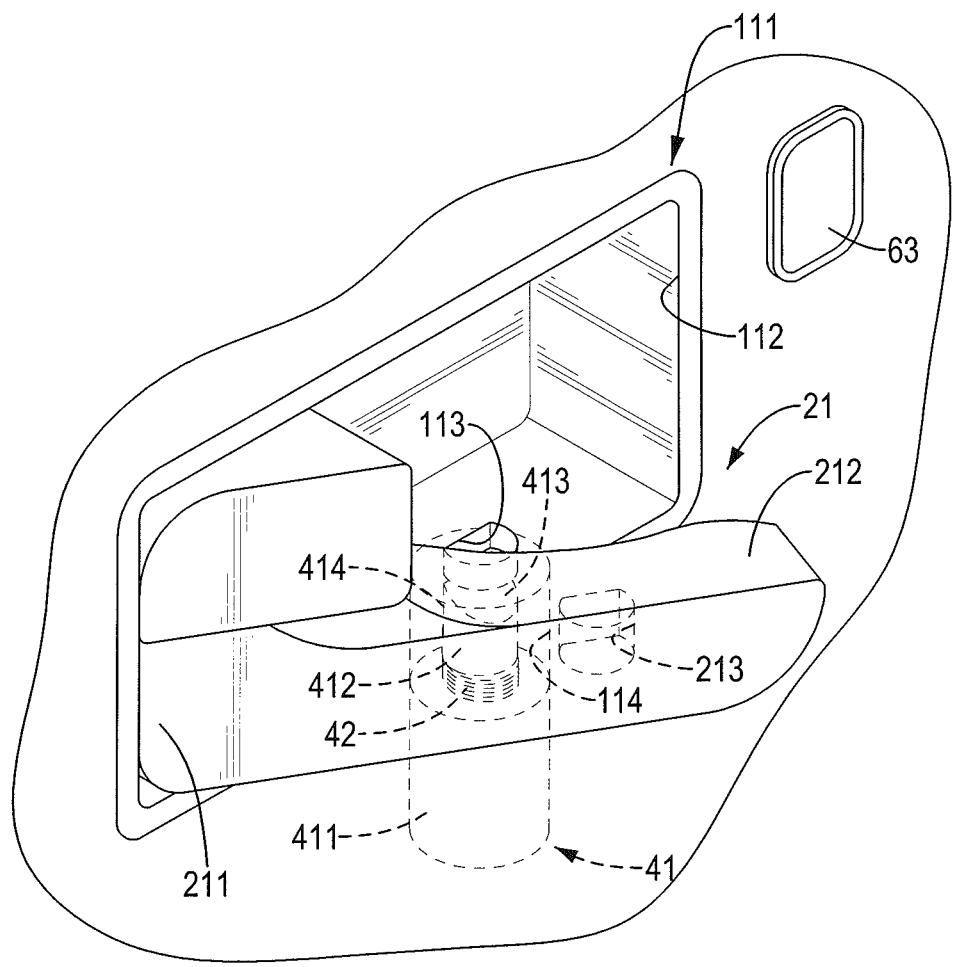
FIG. 3 is an operational enlarged perspective view of the handle unit and the engaging unit of the automotive vehicle with an anti-crash apparatus in FIG. 2.
Figure 4A:
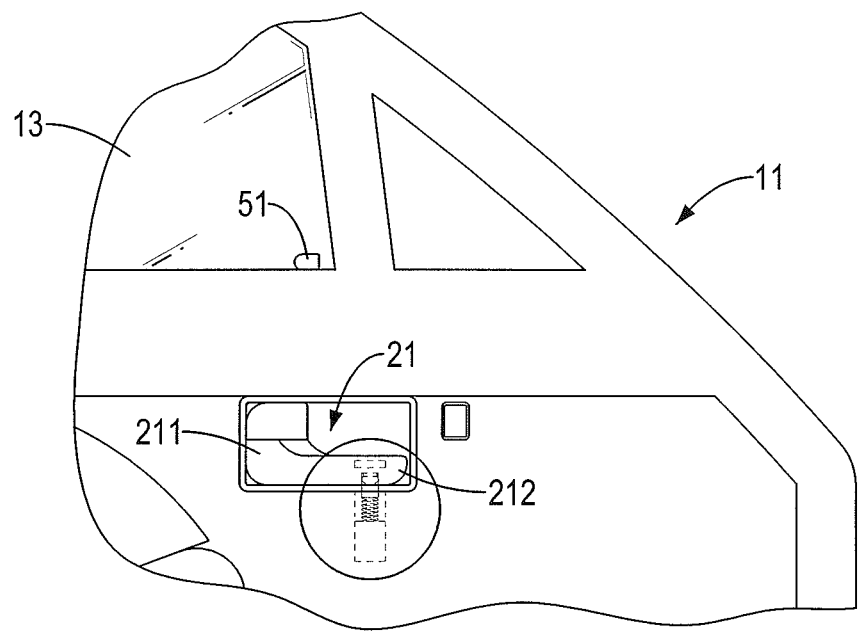
FIG. 4a is a rear side view of the automotive vehicle with an anti-crash apparatus in FIG. 1.
Figure 4B:
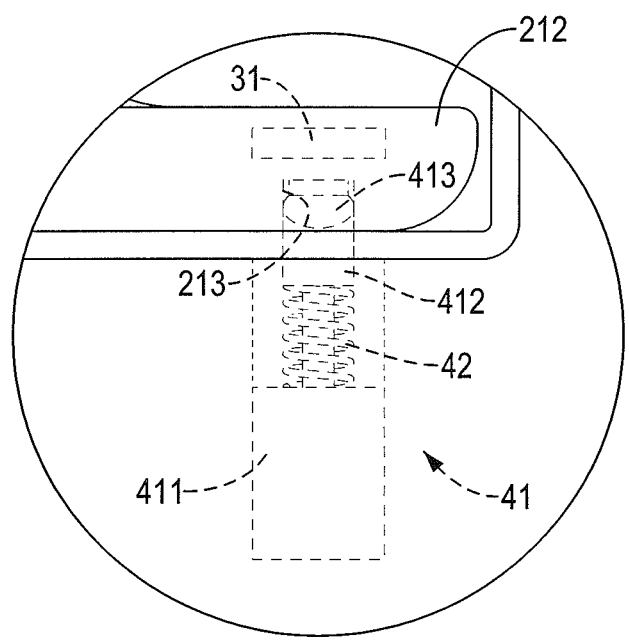
Figure 5:
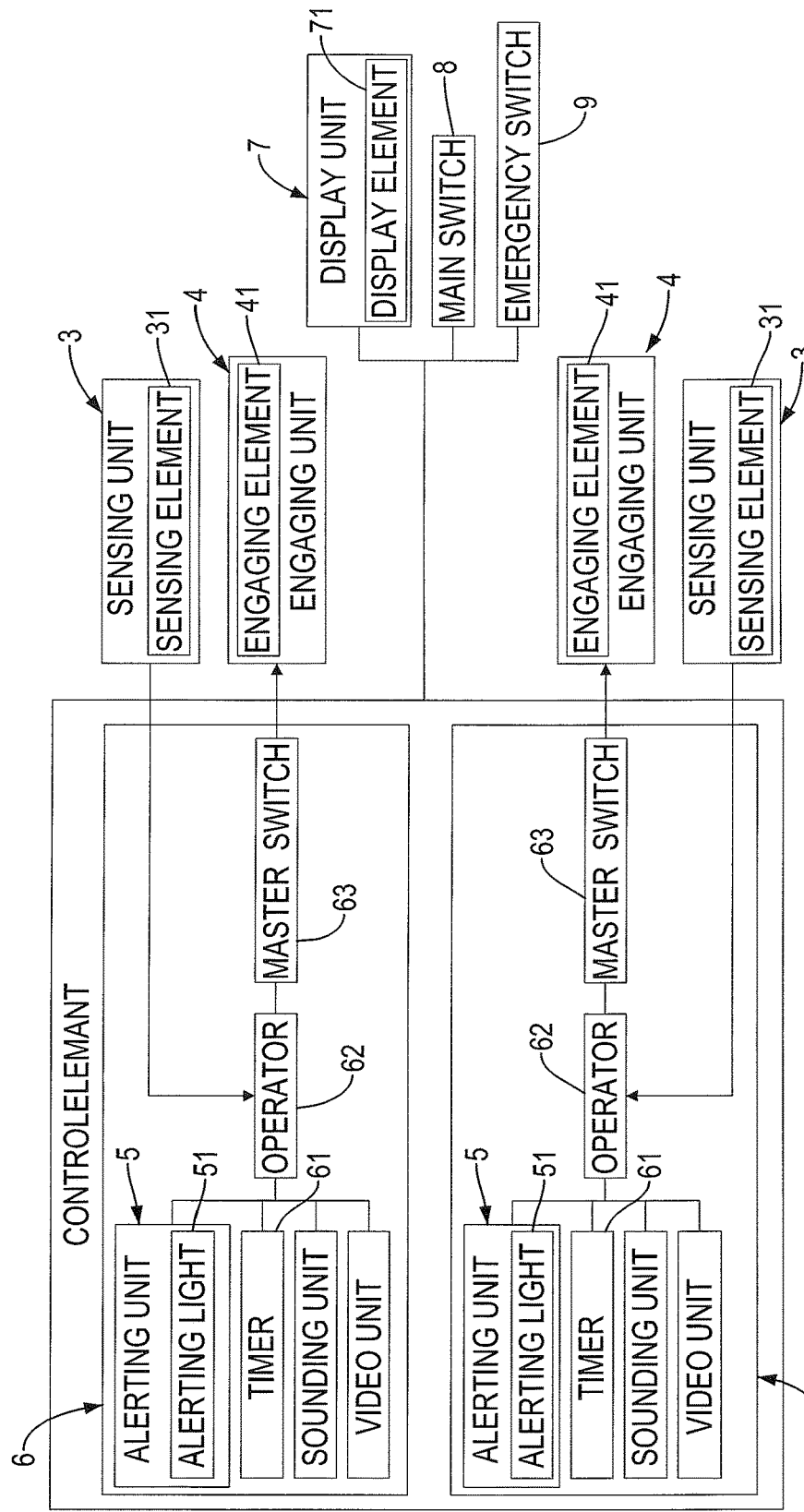
FIG. 5 is a block diagram of the automotive vehicle with an anti-crash apparatus in FIG. 1.

With reference to FIGS. 3 to 5, each one of the doors 11 has a handle frame 111, a frame recess 112, a receiving hole 113, and a receiving slot 114. The handle frame 111 is mounted on the door 11 and has a bottom surface. The frame recess 112 is formed in the handle frame 111. The receiving hole 113 is formed in the bottom surface of the handle frame 11 and communicates with the frame recess 112. The receiving slot 114 is formed in the door 11 and communicates with the frame recess 112 via the receiving hole 113.

The handle unit 2 is mounted in the automotive vehicle 1 and has multiple handles 21, and the handles 21 respectively mounted on the doors 11 and is capable of controlling the doors 11 to close or open. Each one of the handles 21 has a proximal end, a distal end, a bottom surface, a pivoting portion 211, a swinging portion 212, and an engaging portion 213. The pivoting portion 211 is formed on the proximal end of the handle 21 and is pivotally connected to the handle frame 111 of a corresponding door 11. The swinging portion 212 is formed on the distal end of the handle 21 for drivers or passengers to hold. The swinging portion 212 swings between an operating position (as shown in FIG. 4), which is close to the corresponding door 11, and a door opening position (as shown in FIG. 5), which is away from the corresponding door 11. The engaging portion 213 is formed in the handle 21 and the shape of the engaging portion 213 corresponding to that of the receiving hole 113. Preferably, the engaging portion 213 is a recess and is formed in the swinging portion 212 of the handle 21.

The sensing unit 3 is mounted in the automotive vehicle land has multiple sensing elements 31, and the sensing elements 31 are respectively mounted on the doors 11 and are respectively adjacent to the handles 21. Each one of the sensing elements 31 can be a proximity switch, a pressure switch, or a capacitance switch. Each one of the sensing elements 31 can be mounted on an inner surface or an outer surface of a corresponding handle 21. Preferably, each one of the sensing elements 31 is mounted on the inner surface of a respective one of the handles 21. Each one of the sensing elements 31 outputs a sensing signal when a user holds the swinging portion 212 of the corresponding handle 21.

The engaging unit 4 is mounted in the receiving slots 114 of the doors 11 and has engaging elements 41 and elastic elements 42. The engaging elements 41 are respectively disposed on the doors 11 and opposite to the swinging portions 212, the engaging elements 41 may be an electromagnetic valve or an electromagnet. In this embodiment, the engaging element 41 is an electromagnet, and has a body 411, a stop portion 412, a slide face 413, and a blocking face 414. The body 411 is mounted in the receiving slots 114 of the door 11. The stop portion 412 is connected with the body 411 and is moved by the body 411 and engages with the swinging portion 212 of the handle 21.

The slide face 413 and the blocking face 414 are respectively located in the stop portion 412 and opposite to each other. The slide face 413 faces toward the swinging portion 212 of the handle 21.

Each one of the elastic elements 42 is a spring and is mounted between the stop portion 412 and the body 411 to move the stop portion 412 to engage with the handle 21. The stop portion 412 of the engaging element 41 can be moved between an engaged position (as shown in FIG. 4) and a release position (as shown in FIG. 5). The engaged position is a position where the stop portion 412 of the engaging element 41 engages with the engaging portion 213 of the handle 21; the release position is a position where the stop portion 412 of the engaging element 41 departs from the engaging portion 213. The swinging portion 212 of the handle 21 can be limited by the blocking face 414 at the engaged position.

The stop portion 412, the receiving hole 113, and the engaging portion 213 have a same contour that is composed of a straight line with a curve connected with the straight line. Thus, the stop portion 412 will not rotate opposite to the receiving hole 113 and the engaging portion 213 because of the straight line of the contour.

The control unit 6 is connected to the alerting unit 5 and has multiple control elements respectively mounted in the doors 11. Each control elements has a timer 61, an operator 62, a sounding unit, an alerting unit 5, video unit, and a master switch 63. The alerting unit 5 is mounted in the automotive vehicle 1 and has multiple alerting lights 51. The multiple alerting lights 51 are respectively mounted on the doors 11, the rear windshield 12, and the two side mirrors 14. Each one of the alerting lights 51 can be viewed from inside or outside of the doors 11. The alerting unit 5 also can be installed on each of the outer handles of the doors to warn the approaching vehicle. The timer 61 is mounted on the door 11 of the automotive vehicle 1. The operator 62 is electrically connected to the sensing unit 3, the engaging unit 4, the alerting unit 5, and the timer 61. When the operator 62 receives the aforementioned sensing signals from the sensing elements 31, the operator 62 synchronously activates the timer 61 to count for a preset time. After the preset time expires, the operator 62 releases the engagement between the engaging elements 41 and the swinging portions 212 of the handles 21. The preset time in this embodiment can be set in 3-5 seconds. The master switch 63 is mounted on the door 11 and electrically connected with the sensing unit 3 and the operator 62. The master switch 63 can be a button or an electronic lock. When the master switch 63 is pressed or turned, the operator 62 can release the engagement between the engaging element 41 and the handle 21 to open the door 11 immediately in case of emergency such as traffic accident or fire on the vehicle. The switch 63 also can be installed adjacent to the main driver seat. When emergence condition happened, the driver can press the switch 63 to release all the engagement between the engaging element 41 and the handle 21 to open the door 11 immediately. After all passages escape the automotive vehicle, the switch 63 has to press again to reset to default setting.

The main switch is connected electrically with the timers, the sounding units, the alerting units 5, and the video units of the control unit 6.

The emergency switch 64 is connected electrically with the control unit 6 and can be selectively pressed by a passenger of the vehicle to activate the alerting units 5, the sounding units, and the video units. Accordingly, the passenger can leave the vehicle when an emergency occurs. The emergency switch can be set to open the doors in a preset time (ex. 30 second). After a preset period after the doors are opened, the emergency switch 64 will be reset to the default setting.

The doors are individually controlled, so the doors can be opened individually when an emergency occurs. The anti-crash apparatus can be connected with a central control system of the vehicle. Consequently, when the central control system is locked, the anti-crash apparatus can be powered off and the handles are locked. Accordingly, the handles can be kept from being opened unintentionally by children. When the central control system is unlocked, the anti-crash apparatus is powered on.

Figure 6:
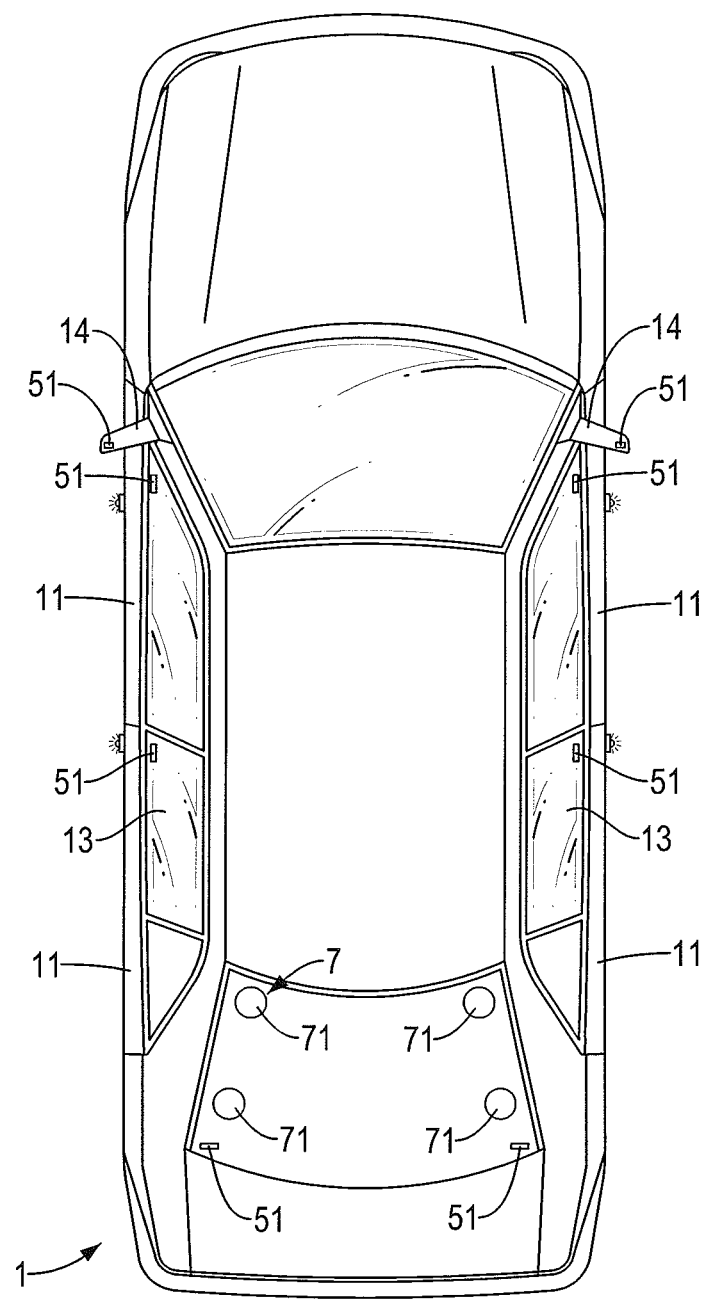
FIG. 6 is a top view of the automotive vehicle with an anti-crash apparatus in FIG. 2.
Figure 7:
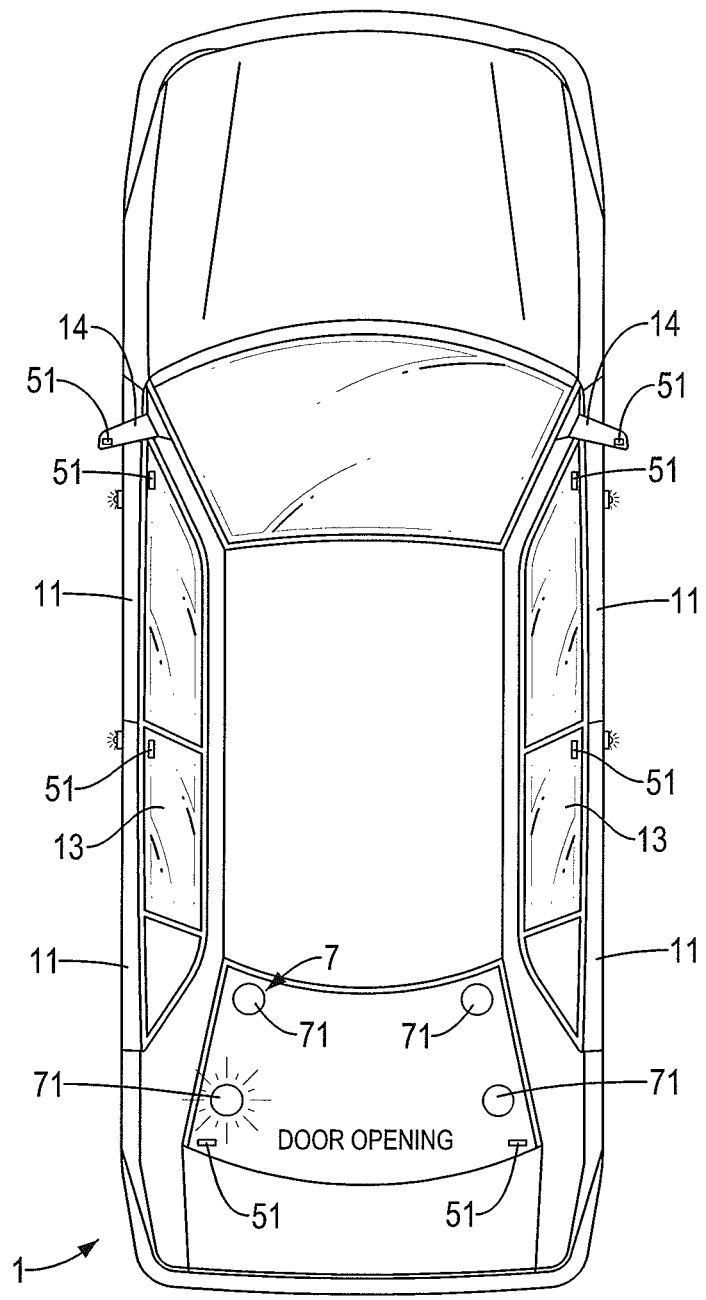
FIG. 7 is an operational top view of the automotive vehicle with an anti-crash apparatus in FIG. 6, showing an alert sign displayed on a rear window of the vehicle.

With reference to FIGS. 3 and 6, the display unit 7 is mounted on the rear windshield 12, is connected to the timer 61 of the control unit 6, and has multiple display elements 71. The display elements 71 are respectively disposed on the corners or middle of the rear windshield 12, and the display elements 71 may show the time counting of the timer 61 or blinks with signs on the corresponding door 11 respectively. The display elements 71 may also be disposed above or below tail lights of the automotive vehicle 1.

With reference to FIGS. 2 to 5, when the driver or the passengers in the automotive vehicle 1 want to open any one of the doors 11, they have to hold the handle 21 of the door 11, which will trigger the sensing element 31 to transmit a sensing signal. After the sensing signal is received by the operator 62, the timer 61 is driven by the operator 62 and starts to count down for the preset time. In the same time, the swinging portion 212 of the handle 21 cannot swing because the swinging portion 212 is limited by the blocking face 414 of the stop portion 412. When the driver or the passengers are ready to get off the automotive vehicle 1 and the corresponding door 11 is locked and cannot be opened, this will force the driver or the passengers to check the approaching vehicles in advance.

At the same time, with reference to FIGS. 3 to 5, the operator 62 detects the position of the sensing element 31 and is driven by the sensing signal of the sensing element 31 to control blinking the alerting lights 51 of the corresponding sensing element 31.

With reference to FIG. 6, if the left-back door 11 is opened and the left-back sensing element 31 outputs the sensing signal, the alerting light 51 on the same side of the automotive vehicle 1 would blink at the same time. Thus, in the delayed door opening time, the alerting lights 51 may alert the approaching vehicles that the corresponding door 11 is going to open.

When the timer 61 counts to 3-5 seconds (the preset time), the operator 62 would control the stop portion 412 of the engaging element 41 to retract to the release position and disengage from the engaging portion 213 of the handle 21, which releases the engagement between the engaging elements 41 and the swinging portion 212 of the handle 21. Thus, the diver or the passengers may hold the swinging portion 212 of the handle 21 and open the corresponding door 11 after the lag about 3-5 seconds.

Significantly, the power supply to the operator 62 is disconnected after the stop portion 412 of the engaging element 41 retracts to the release position for about 10 seconds, and this makes the stop portion 412 move back to the engaging position due to the elastic force of the elastic element 42. If the swinging portion 212 of the handle 21 has moved back to the door opening position, the swinging portion 212 of the handle 21 would move along the slide face 413 of the stop portion 412 after the external force is released, and this makes the stop portion 412 compress the elastic element 42 from the door opening position, and the stop portion 412 moves back to the operating position. The motorcycle riders or car drivers outside the automotive vehicle 1 can observe each count down time of each one of the doors 11 via the display elements 71, and also observe an alerting sign such as "DOOR OPENING" shown on the rear windshield 12, and this may remind the motorcycle riders or car drivers and prevent accidents.

The power supply of this embodiment would be disconnected by the control unit 6 and the engagement between the engaging element and the handle is remained when the speed of the automotive vehicle 1 is over 10 km/hr, and would not trigger this invention accidentally. The power supply of this invention would be connected and remain standby when the speed of the automotive vehicle 1 is under 10 km/hr, so the passengers/children and the driver can escape from the automotive vehicle 1 in case of emergency.

Furthermore, the anti-crash apparatus in accordance with the present invention can be connected with a speed system of the vehicle. When the vehicle is driving in a high speed, the anti-crash apparatus is powered off and the handles 21 are locked. When such an arrangement, the doors can be kept from being opened by children during the vehicle is driving in the high speed. Therefore, the anti-crash apparatus can be severed as a children safety lock for the vehicle to solve the problem of the conventional children safety lock that is operated manually. When the speed of the vehicle is lower than a preset speed, the anit-crash apparatus is powered on.

Figure 8:
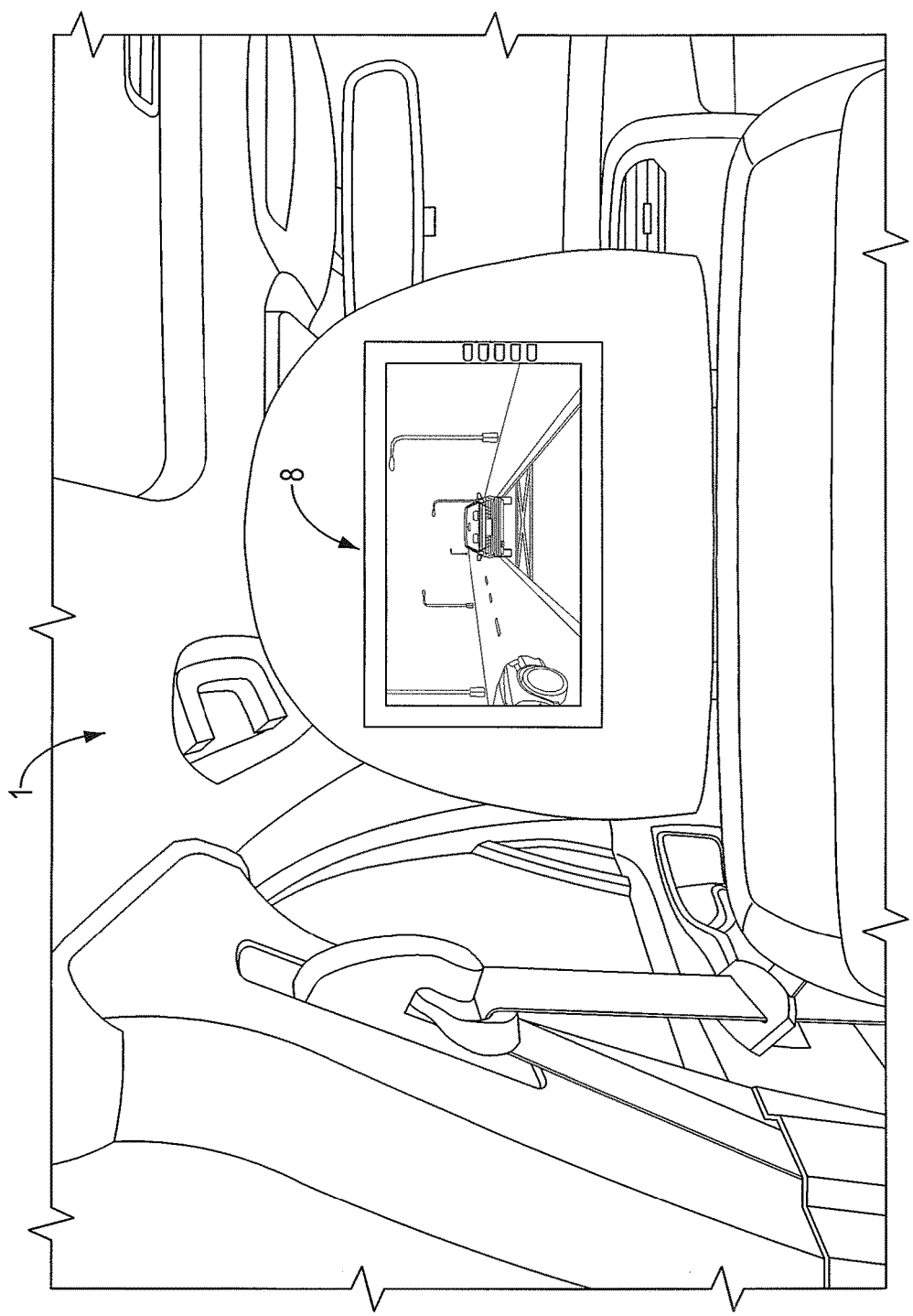
FIG. 8 is a schematic diagram of the automotive vehicle with an anti-crash apparatus, showing a vehicle monitor connected with the anti-crash apparatus for monitoring approaching vehicles from behind.

With reference to FIG. 8, the anti-crash apparatus further has a vehicle monitor 8 mounted inside the automotive vehicle and connected with the sensing unit 3 and the control unit 6. When the sensing unit 3 detects any one of the handles 21 being held, the vehicle monitor 8 shows the coming vehicle outside of the doors 11 to help the user check the approaching vehicle. Whether the automotive vehicle in start status or in stop status, the vehicle monitor 8 will show the situation outside the car when the handles 21 being touched.

The anti-crash apparatus in accordance with the present invention can be operated automatically or manually. When the vehicle is damaged or the power of the vehicle is off, the driver of passenger can open the door manually with a key or a specific tool without broking the windows. The power for the operation of anti-crash apparatus is small, so the operation of the anti-crash apparatus is power-saving. The time sequence of the handles 21 and the stop portion 412 moving to original positions can be well controlled. The stop portion 412 can move back to the original position first, and the handle 21 is released and pushes the corresponding stop portion 412 away from the original position. When the handle 21 moves to the original position, the stop portion 412 can inserted into and lock the handle 21. Alternatively, the handle 21 can be move to the original position first, and the corresponding stop portion 412 can then move to the original portion to lock the handle 21.

Figure 9A:
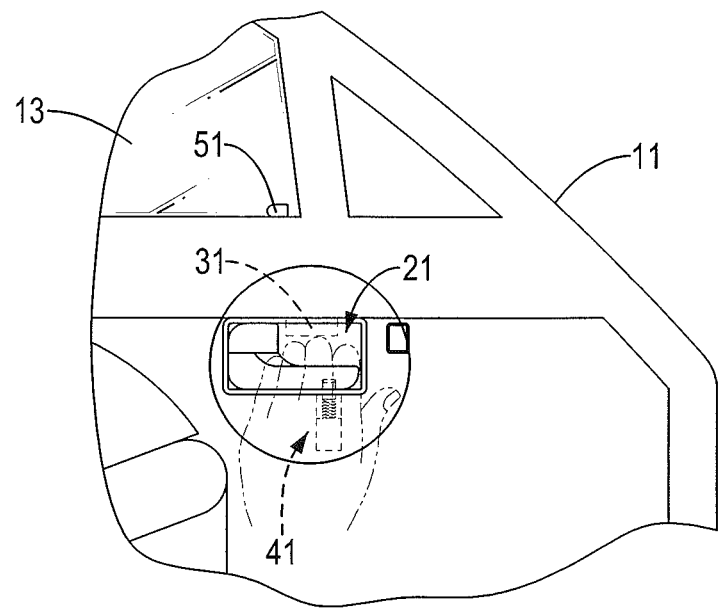
FIG. 9a is a rear side view of a second embodiment of an automotive vehicle with an anti-crash apparatus in accordance with the present invention.
Figure 9B:
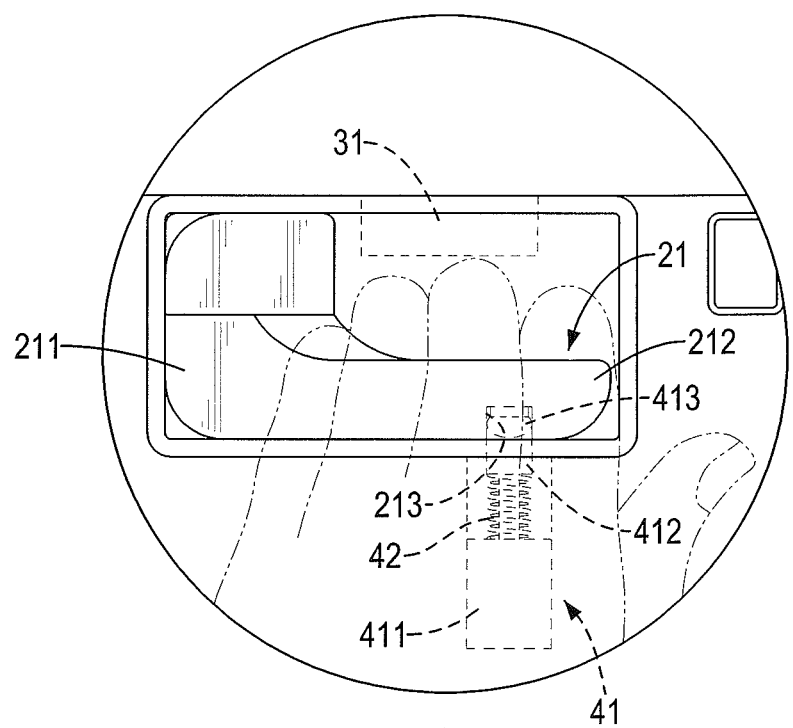

With reference to FIGS. 9a and 9b, the second embodiment of this invention is substantially the same as the first embodiment except for the following features.

Each one of the sensing elements 31 of the sensing unit 3 is a photoelectric switch, and is installed on a detecting route of the swinging portion 212 of the handle 21 to detect the user's hand approaching. In this embodiment, each one of the sensing elements 31 is installed above the swinging portion 212 of the handle 21.

When the passengers or the drivers hold the handle 21, the sensing element 31 would be driven and the sensing element 31 would be triggered to transmit a sensing signal. Thus, the operator 62 would control the stop portion 412 of the engaging element 41 to release the engagement between the engaging elements 41 and the swinging portion 212 of the handle 21.

With reference to FIGS. 10 to 13, the third embodiment of this invention is substantially the same as the first embodiment except for the following features.

The engaging portion 213A is formed on a bottom of the swinging portion 212 and is corresponding in position to the stop portion 412 of the engaging element 41.

Figure 10:
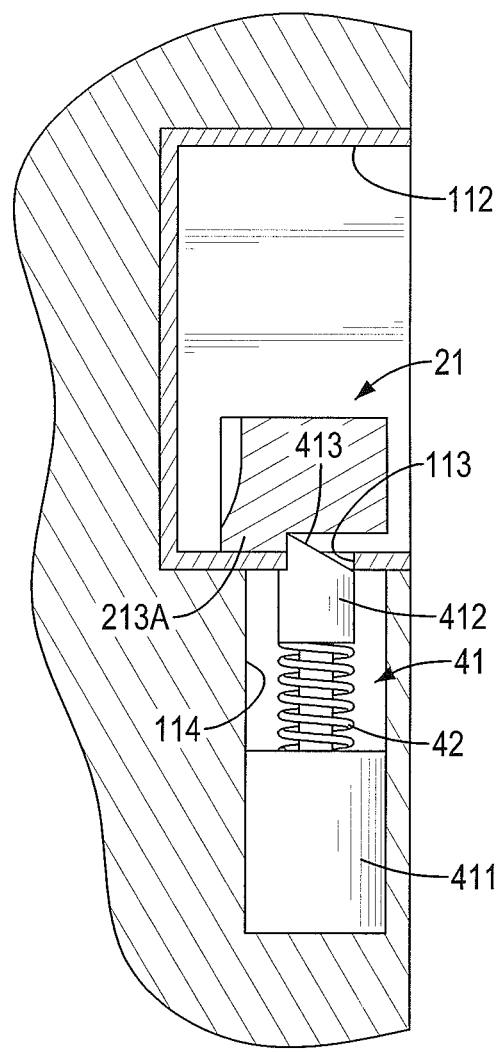
FIG. 10 is a side view in partial section of a third embodiment of an automotive vehicle with an anti-crash apparatus in accordance with the present invention.
Figure 11:
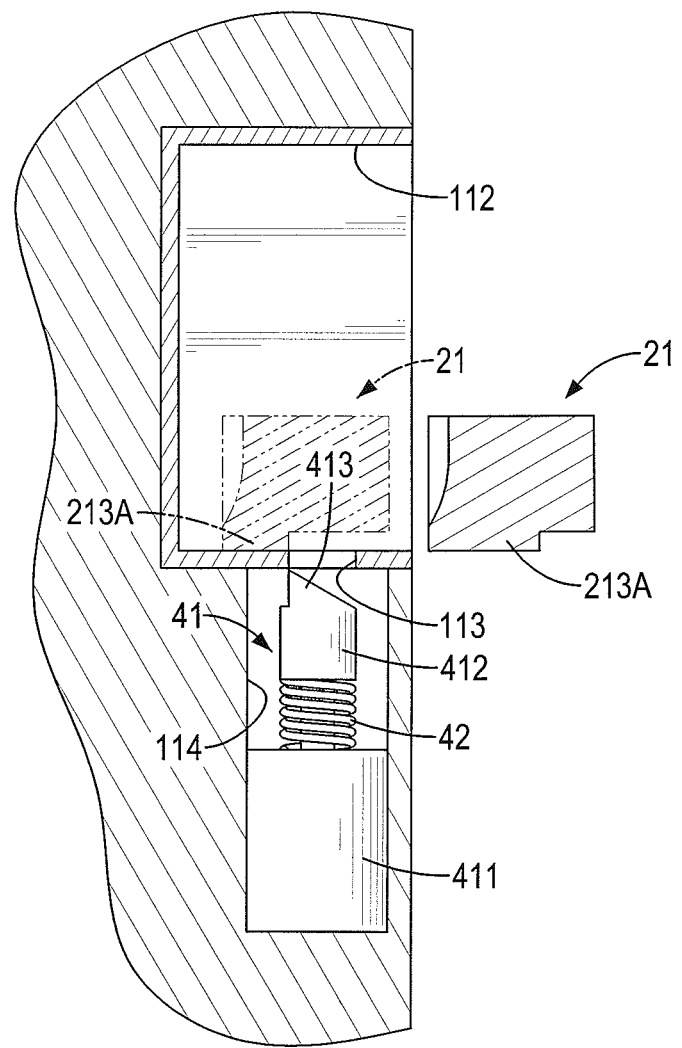
FIG. 11 is an operational side view in partial section of the automotive vehicle with an anti-crash apparatus in accordance with the present invention.

With reference to FIGS. 10 and 11, the engaging portion 213A is an elongated block, and a bottom surface of the engaging portion 213 is totally flush with the bottom surface of the frame recess 112.

Figure 12:
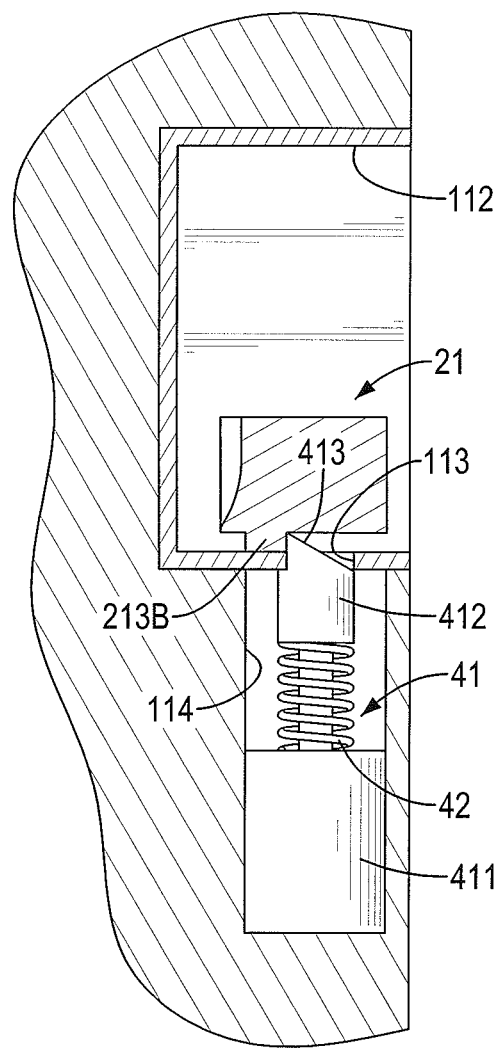
FIG. 12 is a side view in partial section of another configuration of the third embodiment of an automotive vehicle with an anti-crash apparatus in accordance with the present invention.

With reference to FIG. 12, the engaging portion 213B is an elongated block, the engaging portion 213B has a bottom surface and a recess formed on the bottom surface of the engaging portion 213B. The bottom surface of the engaging portion 213B is partially flush with a bottom surface of the frame recess 112.

Figure 13:
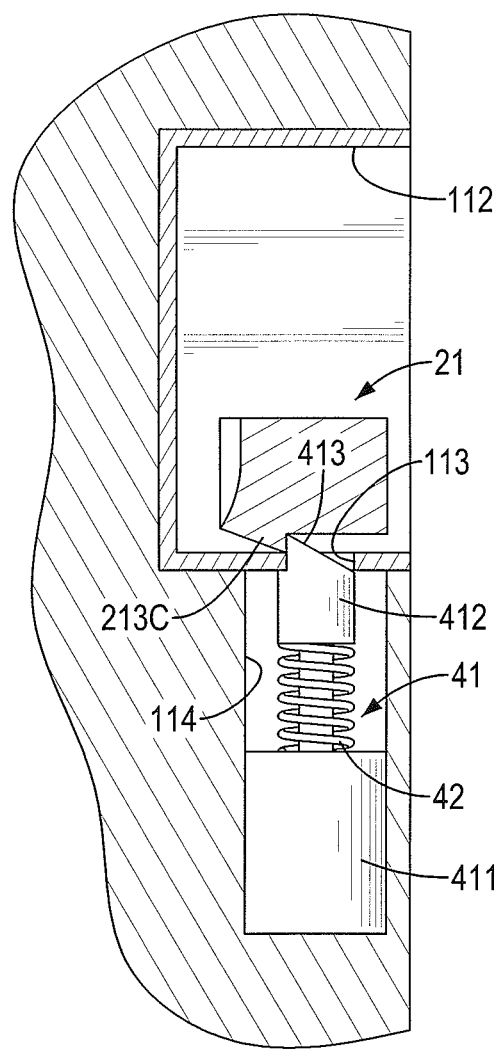
FIG. 13 is a side view in partial section of a further configuration of the third embodiment of an automotive vehicle with an anti-crash apparatus in accordance with the present invention.

With reference to FIG. 13, the engaging portion 213C is an elongated triangular block, and abuts the bottom surface of the frame recess 112 at a point.

The stop portion 412 and the slide face 413 of each one of the engaging elements 41 is exposed on the frame recess 112. When the stop portion 412 of the engaging element 41 is located at the engaging position, the engaging portion 213 of the corresponding handle 21 blocks the blocking face 414 of the stop portion 412, so the corresponding handle 21 cannot swing since the corresponding handle 21 is held stably at the operating position.

When the stop portion 412 of the engaging element 41 is located at the release position and departs from the engaging portion 213 of the corresponding handle 21, the engagement between the engaging element 41 and the swinging portion 212 of the handle 21 is released. So the passengers or the driver may hold the swinging portion 212 of the corresponding handle to the door opening position and open the corresponding door 11 after 3-5 seconds delay. The engaging element 41 is not located at the release position if the power supply is disconnected. The passengers or the driver still can insert a key or a card into a slot between the slide face 413 of the engaging element 41 and the corresponding handle 21 to push the engaging portion 213 to depart from the blocking face 414 and to push the stop portion 412 into the receiving slot 114. So the passengers or the driver can manually open the corresponding door 11 inside the automotive vehicle 1.

Figure 14:
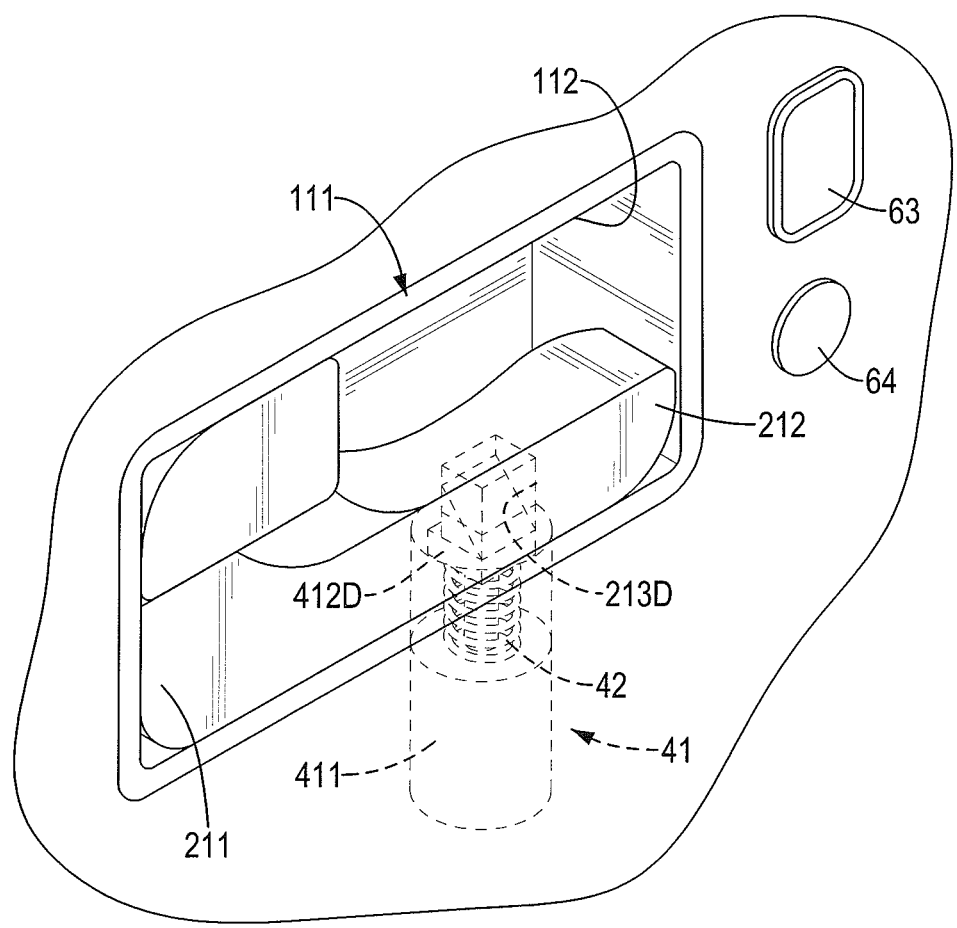
FIG. 14 is a perspective view of a handle unit and an engaging unit of a fourth embodiment of an automotive vehicle with an anti-crash apparatus in accordance with the present invention.
Figure 15:
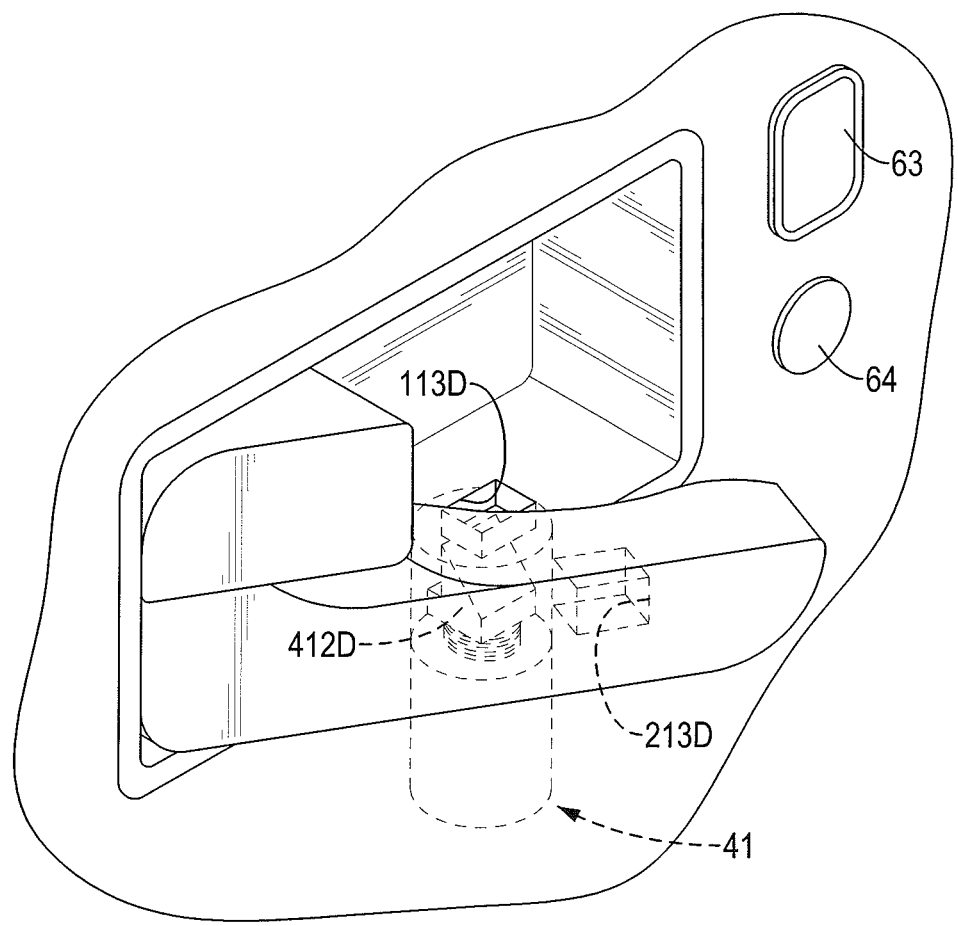
FIG. 15 is an operational perspective view of the handle unit and the engaging unit of the automotive vehicle with an anti-crash apparatus in FIG. 14.
Figure 16:
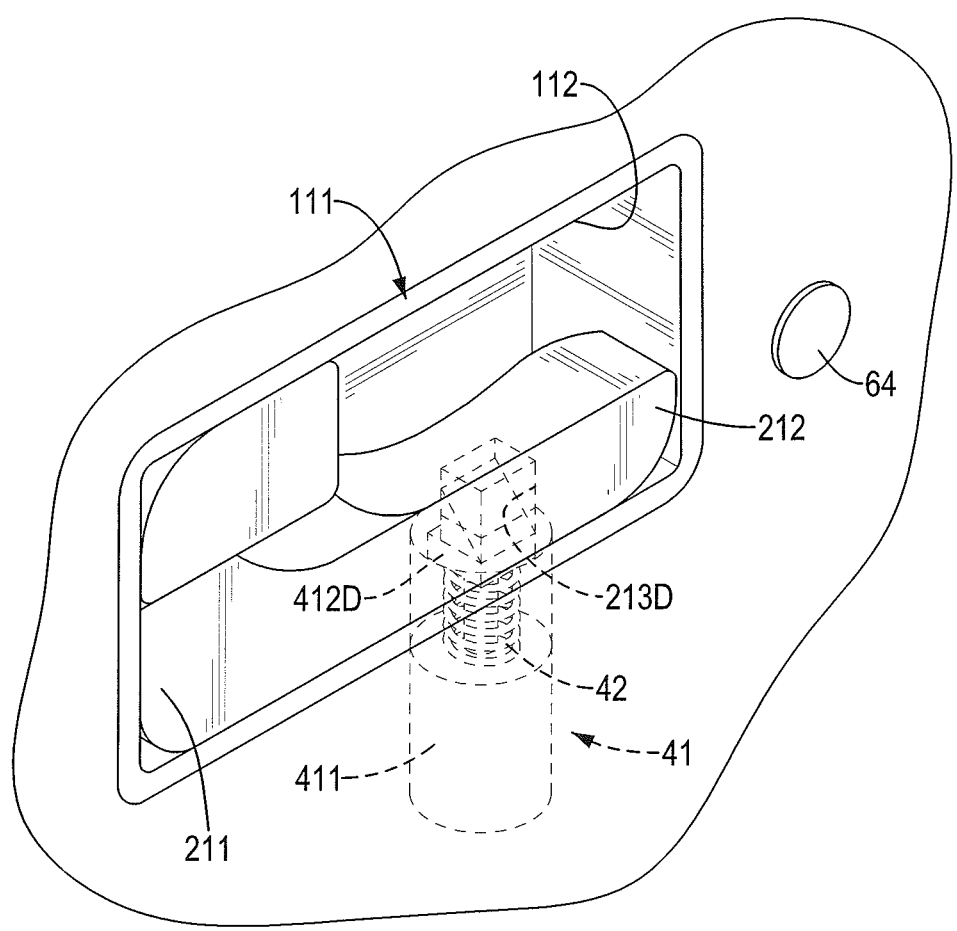
FIG. 16 is another operational perspective view of the handle unit and the engaging unit of the automotive vehicle with an anti-crash apparatus in FIG. 14.

With reference to FIGS. 14 to 16, the fourth embodiment of this invention is substantially the same as the first embodiment except for the following features. The engaging portion 213D is formed in a bottom of the swinging portion 212 and is corresponding in position to the stop portion 412D of the engaging element 41. The engaging portion 213D and the receiving hole 113D are elongated rectangular recesses, and a bottom surface of the engaging portion 213D is totally flush with the bottom surface of the frame recess 112.

Because the stop portion 412 and the slid face of the engaging element 41 are partially exposed from the corresponding handle 21, the engaging element 41 can be disengaged from the corresponding handle 21 by inserting a key or a card into a space between the slide face 413 and the handle 21. Therefore, the handle 21 can be unlocked when the anti-crash apparatus is powered off. With reference to FIGS. 12 and 13, the engaging portion 213 C is formed on the pivoting portion 211C of the handle 21C. The engaging element 41C is located below the engaging portion 213C. a pivoting rod 115C is mounted through the door frame 111 and the handle 21 to allow the handle 21 to be pivoted relative to the door 11.

Based on the above descriptions, the aforementioned embodiments have the following advantages.

First, before opening the doors 11, the users are forced to check the approaching vehicles by delaying the opening time of the doors 11. The alerting unit 5 may alert the occupants in the automotive vehicle 1 and the approaching vehicles, and improve the safety.

Second, the handles 21 can be engaged by the engaging unit 4 and can be operated independently without affecting the door opening structure from inside or outside the doors 11. Therefore, even if the automotive vehicle has a breakdown or battery failure, the driver can open the door 11 with the keys, or open the door 11 manually, and enhance the convenience and practicality.

The anti-crash apparatus in accordance with the present invention has a light weight and a simplified structure, is power-saving in operation, and is easily repaired. The video unit and the display can be activated to show the views behind the vehicle when the handles 21 are pulled even when the vehicle is power off. The anti-crash apparatus can keep the doors from being opened improperly to prevent accidents from occurring.

What is claimed is:

1. An automotive vehicle comprising:
multiple doors respectively disposed on two sides of the automotive vehicle and a rear windshield disposed on a rear end of the automotive vehicle; and
an anti-crash apparatus mounted in the automotive vehicle and comprising
a handle unit in the automotive vehicle and having
multiple handles respectively mounted on the doors for respectively controlling each door, and each handle having
a proximal end;
a distal end;
a bottom surface;
a pivoting portion formed on the proximal end of the handle and pivotally connected with the corresponding door; and
a swinging portion formed on the distal end of the handle;
a sensing unit mounted in the automotive vehicle and having
multiple sensing elements respectively mounted in the doors and being disposed at positions respectively adjacent to the handles;
an engaging unit mounted in the automotive vehicle and having
multiple engaging elements respectively disposed on the doors of the automotive vehicle and opposite to the swinging portion, each one of the engaging elements adapted to engage with a respective one of the handles;
a control unit mounted in the automotive vehicle and electrically connected with the sensing unit and having multiple control elements, each control element having:
a timer electrically connected with the sensing unit;
a sounding unit;
an operator electrically connected with the timer, the sensing unit, and the engaging unit;
an alerting unit mounted in the automotive vehicle and electrically connected with the operator, the control unit and the sensing unit;
a video unit; and
a power supply connected electrically with the engaging unit, wherein the operator of the control unit receives a sensing signal outputted from each sensing element when the swinging portion of the handle is held by a user, the timer is activated by the operator to count for a preset time and to activate the alerting unit to put out an alert by the sensing signal, and then the control unit releases an engagement between the engaging element and the handle;

a main switch connected electrically with the timer, the sounding unit, the alerting unit, and the video unit of the control unit; and an emergency switch connected with the sounding unit, the alerting unit, and the video unit of the control unit.

2. The automotive vehicle with an anti-crash apparatus as claimed in claim 1, wherein the control unit is capable of disconnecting the power supplies of the control elements from the engaging unit when a speed of the vehicle is lower than a present speed.

3. The automotive vehicle with an anti-crash apparatus as claimed in claim 1, wherein when a speed of the vehicle is lower than a preset speed, the power supplies of the control elements are in default settings.

4. The automotive vehicle with an anti-crash apparatus as claimed in claim 1, wherein the main switch is adjustable to disconnect from the timers of the control elements.

5. The automotive vehicle with an anti-crash apparatus as claimed in claim 2, wherein the main switch is adjustable to disconnect from the timers of the control elements.

6. The automotive vehicle with an anti-crash apparatus as claimed in claim 1, wherein each one of the sensing elements is a proximity switch, a pressure switch, or a capacitance switch; and each one of the sensing elements is mounted in one of an inner surface and an outer surface of the corresponding handle.

7. The automotive vehicle as claimed in claim 1, wherein each one of the sensing elements of the sensing unit is a photoelectric switch, and is installed on a detecting route of the swinging portion of the handle.

8. The automotive vehicle as claimed in claim 1, wherein each one of the engaging elements is an electromagnetic valve, and has a body formed in the door; and a stop portion connected with the body and moved by the body to engage with the corresponding handle; and the stop portion of each one of the engaging elements is movable between an engaged position where the engaging element is engaged with the engaging portion and a release position where the engaging element departs from the engaging portion.

9. The automotive vehicle as claimed in claim 1, wherein the alerting unit has multiple alerting lights mounted on the doors of the automotive vehicle.

10. The automotive vehicle as claimed in claim 9, wherein the alerting lights are mounted on windows of the doors of the automotive vehicle.

11. The automotive vehicle as claimed in claim 9, wherein the alerting lights are mounted on side mirrors and outer handles of the doors of the automotive vehicle.

12. The automotive vehicle as claimed in claim 1, wherein the anti-crash apparatus further has a display unit connected to the timer of the control unit and having multiple display elements disposed on the rear windshield of the automotive vehicle, and the display elements respectively showing the time counting of the timer of the doors.

13. The automotive vehicle as claimed in claim 1, wherein each control element of the control unit further has a master switch mounted on the door and electrically connected with the sensing unit and the operator of the control element for releasing the engagement between the engaging elements and the handle in case of emergency.

14. The automotive vehicle as claimed in claim 1, further including a vehicle monitor mounted inside the automotive vehicle and connected with the sensing unit and the control unit for showing approaching vehicle when the handle being held.

15. The automotive vehicle as claimed in claim 1, wherein the engaging unit further has a slide face and a blocking face respectively located in the stop portion and opposite to each other; and the slide face faces toward the swinging portion of the handle.

16. The automotive vehicle as claimed in claim 1, wherein the anti-crash apparatus is mounted on a side door, a rear door or a sliding door of the vehicle.

* * * * *